(12) United States Patent
Munster

(10) Patent No.: US 7,540,938 B2
(45) Date of Patent: Jun. 2, 2009

(54) METHOD AND SYSTEM FOR ENERGY SAVINGS IN TMP BY HIGH TEMPERATURE LC/MC REFINING OF PULP

(75) Inventor: Heinrich Munster, Vienna (AT)

(73) Assignee: Andritz AG, Graz (AT)

( * ) Notice: Subject to any disclaimer, the term of this patent is extended or adjusted under 35 U.S.C. 154(b) by 387 days.

(21) Appl. No.: 11/421,784

(22) Filed: Jun. 2, 2006

(65) Prior Publication Data

US 2007/0119557 A1    May 31, 2007

Related U.S. Application Data

(60) Provisional application No. 60/686,934, filed on Jun. 3, 2005.

(51) Int. Cl.
*D21C 11/06* (2006.01)

(52) U.S. Cl. ............................ 162/47; 162/19; 162/17

(58) Field of Classification Search ............... 162/47, 162/19, 17
See application file for complete search history.

(56) References Cited

U.S. PATENT DOCUMENTS

| 7,279,073 B2 * | 10/2007 | Bowman et al. ............ 162/261 |
| 2003/0056910 A1 * | 3/2003 | Mullen et al. ............... 162/16 |

* cited by examiner

*Primary Examiner*—Mark Halpern
(74) *Attorney, Agent, or Firm*—Nixon & Vanderhye P.C.

(57) ABSTRACT

A method for recovering heat from a pulp refining process comprising: discharging pressurized pulp from a high pressure refiner, wherein the pressurized pulp comprises a pressurized slurry of fibers and liquid; introducing at least the liquid from the pressurized pulp slurry to a pressurized flash tank; exchanging heat from the pressurized flash tank with water, such that the water is heated, and using the heated water in the pulp refining process.

18 Claims, 2 Drawing Sheets

METHOD AND SYSTEM FOR ENERGY SAVINGS IN TMP BY HIGH TEMPERATURE LC/MC REFINING OF PULP

This application claims the benefit of U.S. Provisional Application Ser. No. 60/686,934, filed Jun. 3, 2006, which provisional application is incorporated by reference in its entirety.

BACKGROUND OF THE INVENTION

Energy savings in mechanical pulping are highly desirable from an economical and ecological perspective and could significantly contribute to improve the overall competitiveness of the Paper and Board Industry.

One method to reduce the energy requirements of conventional thermo-mechanical pulping (TMP) without sacrificing pulp quality is low consistency (LC) refining at 70° C. to 90° C. right after the latency chest. This method typically achieves only a 5% to 8% specific energy reduction. Further, the method typically causes significant fiber shortening and loss of tear strength. Chemo-mechanical pulps (CMP) and chemo-thermo-mechanical pulps (CTMP) provide much higher potential for energy savings by LC refining because their lignin softening temperature is lower, typically below 100° C., and the more flexible fibers are more resistant to higher refining intensity and higher specific energy applications in the LC stage.

Both types of virgin fibers for papermaking, namely chemical pulps and mechanical pulps, are burdened: the first (chemical) by high wood-consumption and the second (mechanical) by high electric energy demand. The energy consumption of mechanical pulping represents about 20% of the worldwide electric energy demand of papermaking and is nearly as much as the electric energy consumed by the countries of Austria and Switzerland together.

Energy efficiency of mechanical pulping is poor as compared to other processes used in papermaking, such as pumping, drying, conveying and electric energy generation. While the energy efficiency of mechanical pulping is debated, calculations and estimations range from 0.012% to a few percent and up to 40-60%. However, it is believed that the estimation of efficiencies as high as 40-60% is in error because evidently more than 90% of the refining energy used in thermo-mechanical pulps (TMP) is converted into heat.

Less than 10% of the total energy to produce pulp for papermaking is typically used to separate the wood into individual fibers. These individual fibers are then delaminated (internal fibrillation), fines are peeled from the middle lamella and the primary and secondary layers of the fiber wall, and the remaining secondary wall is fibrillated. At the same time the fibers are flexibilized and partially even collapsed and split. These effects are achieved by many thousands of load changes (compression and relaxation). This fatiguing process in the compressible medium steam is called refining.

Methods to make the refining process more efficient have recently centered around optimizing the refining intensity, defined as the energy transfer per impact, and rapid and selective heating of the fibers beyond the lignin softening temperature in order to make them more resistant to better withstand the harsher treatment. Exposing the wood prior to refining to high compaction and sheer forces in order to create optimum separation/fracture zones in the cellulose-rich areas of the fiber wall is also one of the newer strategies. Treating wood chips with enzymes is another new development to reduce the electric energy consumption. Optimization of the refining intensity was accomplished by raising the refiner speed, by increasing the disc diameter and by proper refiner plate configuration such as nonradial expelling or turbine plates.

BRIEF DESCRIPTION OF THE INVENTION

A novel and unobvious system has been developed for low-consistency (LC) and medium consistency (MC) refining of TMP at temperatures above 100° C., which is at or above the lignin softening temperature. The pulp consistency is varied between 4% and 10%. Significant energy savings at comparable pulp properties have been achieved. The system can be used to recover a high percentage of the refining energy applied in LC and MC refining in the form of low pressure steam. The system exchanges heat released from a pressurized flash tank with water to produce steam that is fed back to a pressurized cyclone. The system also has the potential to simplify the TMP flow sheet by reducing latency chest and screening requirements.

In one example, a pressurized pulp slurry is expanded in a pressurized flash tank and the slurry passes through a heat exchanger where heat from the pulp slurry is transferred to dilution water that is used in an upstream cyclone of the LC pulp refining process. In another example, a pressurized pulp slurry is dewatered (under pressure) in a screw press and only filtrate from the slurry is expanded in a pressurized flash tank. The expanded filtrate flows from the tank to a heat exchanger where tit heats process water, that later. The pulp pressate flow from the screw press to further pulp processing stages.

In one embodiment, the invention is a method for recovering heat from a pulp refining process comprising: discharging pressurized pulp from a high pressure refiner, wherein the pressurized pulp comprises a pressurized slurry of fibers and liquid; introducing at least the liquid from the pressurized pulp slurry to a pressurized flash tank; exchanging heat from the pressurized flash tank with water, such that the water is heated, and using the heated water in the pulp refining process.

DETAILED DESCRIPTION OF THE INVENTION

One way to reduce the energy demand of conventional TMP is to install a low consistency (LC) refining stage right after primary and secondary high consistency refining stages and the latency chest. Energy savings of 5% to 8% or even more have been reported without sacrificing pulp properties. Similar tear strength and sometimes even slightly higher tensile strength and lower shive levels have been reported. The 5% to 8% reduction of the electric energy consumption when producing a newsprint-type pulp is based on the total applied refining energy which is in the reference case about 2200 kWh/t. This third stage low consistency refining approach has found relatively wide acceptance particularly in North America and usually provides increased capacity for TMP. However, there is still a long felt need for improved energy efficiency in TMP processes.

To the best of applicant's knowledge, it was not previously known why a moderate energy input of about 80 kWh/t to 90 kWh/t in low consistency TMP refining achieves similar results as an energy input of about 270 kWh/t in high consistency refining. From that viewpoint it is a very dramatic reduction in energy demand. Similar 1:3 ratios have been recognized when comparing low and high consistency refining of chemical pulps. The lower energy demand can probably attributed to the comparatively high intensity treatment in the low consistency refiner and other contributing factors:

1. Sufficient water in LC favors generation of hydrobonds and swelling of the fibers.

2. A smaller, but uniform and stable plategap and even load-distribution due to a very stable mass flow.

3. Generally a more efficient energy transfer in an incompressible medium.

When more and more energy is applied in the LC stage after the latency chest at approximately 80° C. and when the refining intensity is raised the tendency to shorten fibers increases. An established method to postpone or protract the fiber-shortening effect is to further flexibilize the fibers by heating (or chemical treatment) in order to make them more resistant to the harsher treatment.

The basic idea behind this study is therefore to rapidly heat fibers in the liquid phase to or above the lignin softening temperature and to refine the fibers at low or medium consistency. This concept for "pure" mechanical pulps is also supported by the known effect that LC refining can be successfully applied to lower the energy demand of chemomechanical pulping because the lignin softening temperature has been lowered, typically below 100° C., due to alkaline swelling and/or sulphonation.

Some earlier high temperature, low consistency refining trials failed because of the difficulty to rapidly heat a pulp slurry via heat exchangers. Direct steam heating was therefore the method of choice. Usually TMP/CTMP laboratory systems, even the most modern ones, do not operate, under pressure, at low or medium pulp consistencies.

Figure 1:
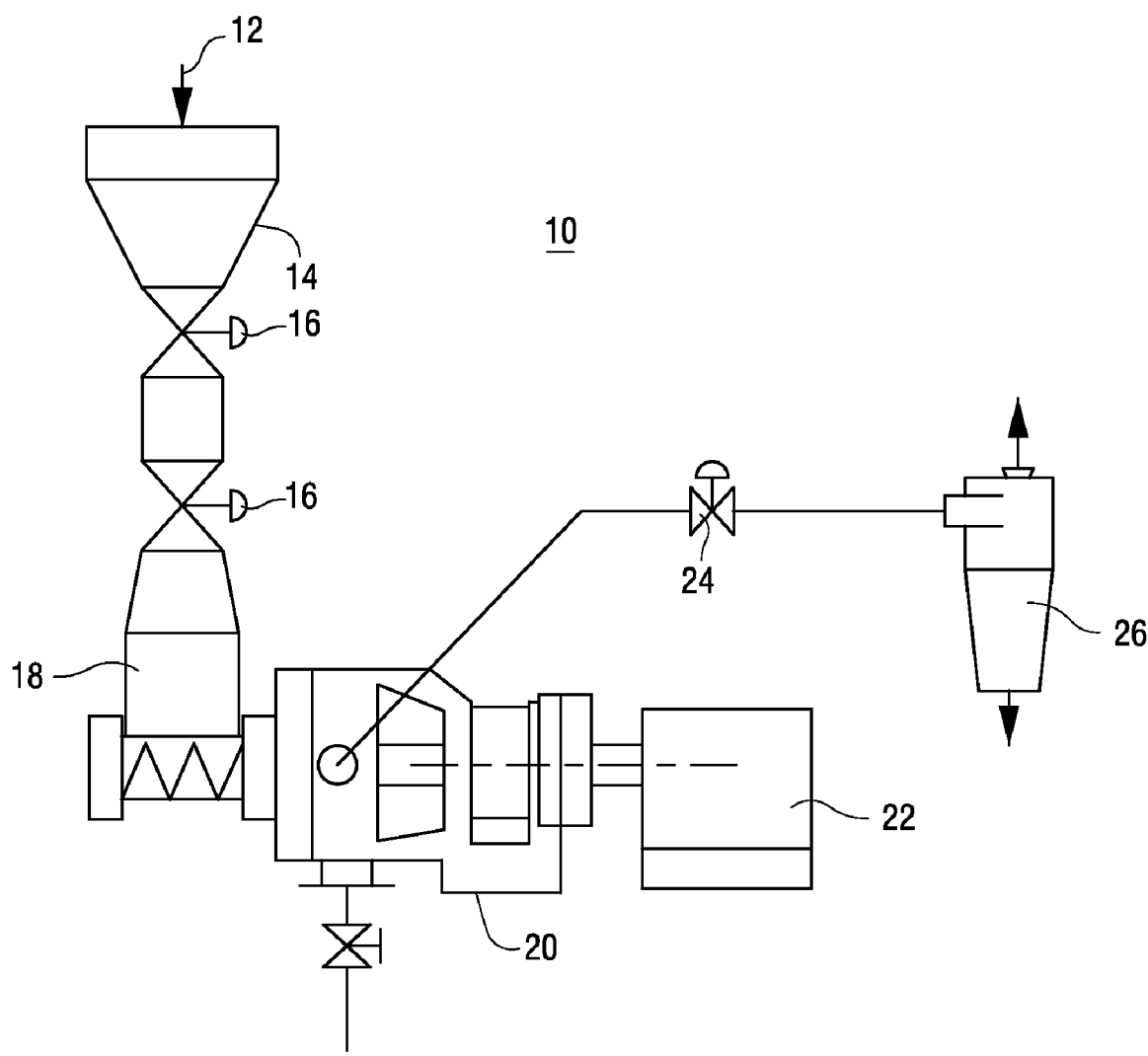
FIG. 1 is a flow sheet for a pulp refining plant that does not recover high pressure steam from flash tanks.

FIG. 1 is a simplified flow sheet of the Afocel pilot plant 10. The recently installed TMP/CTMP pilot facility at Afocel (represented in FIG. 1) has a chip/pulp 12 feeding system, e.g., hopper 14, which includes two alternately operated valves 16 and can be fed with any type of chips or pulp at any consistency. The pulp slurry discharged form the feeding system can be rapidly heated in an agitated steaming vessel 18 and metered to a 12" Andritz Sprout-Bauer Pressurized Laboratory Refiner 20 which is driven by a 45 kW variable speed motor 22. A control system (not shown) enable accurate measurements and integration of the energy uptake over a certain time respectively production quantity. From the pressurized refiner the pulp is discharged via a blow valve 24 and a cyclone 26.

For the pilot trials pulp form the first refining stage at the Stora Enso Corbehem TMP plant with a freeness of about 350 ml CSF was used. The raw material was the typical blend of 80% spruce and 20% poplar. The TMP plant at Corbehem is a two-line three-stage system producing a total of 480-500 b.d.t/d. The three-stage high consistency TMP operation including reject refining in the 2nd and 3rd mainline refining stages consumes 2800-2900 kWh/b.d.t in order to produce an unscreened 80-90 ml CSF pulp for LWC paper grades.

The test program comprised the following trial runs:

1. Conventional TMP production at the pilot plant at various specific energy levels in order to compare energy requirements and pulp properties with those of the industrial operation at SE Corbehem.

2. Low consistency (4% to 5%) refining at conventional 80° C. and four different specific energy levels.

3. Medium consistency (10%) refining at conventional 80° C. and four different specific energy levels.

4. Low consistency refining like trial run No. 2, however after rapid heating to 140-150° C. Prior to refining, the pulp was preheated to about 80° C. in a water bath. Again four specific energy levels were applied.

5. Medium consistency refining like trial run No. 3, however after rapid heating to 140-150° C. Again the pulp was preheated to about 80° C. in a water bath and four specific energy levels were applied.

All pulps were tested according to TAPPI standards for Canadian Standard Freeness (CSF), tensile and tear strength, lightscattering coefficient and brightness. Handsheets were made according to international standard T205. Fiber characteristics and shive content were measured by using a MorFi analyzer. The five "final" pulps were also analyzed for residual latency.

A condition which simplifies the industrial implementation of the high temperature LC/MC refining process is that the pulp from the first high consistency refining stage is available in a blowline at high temperature together with sufficient process steam in order to rapidly heat the dilution water required for the LC/MC stage. To improve heat economy, process steam may be generated from heat recovered from a flash tank.

Figure 2:
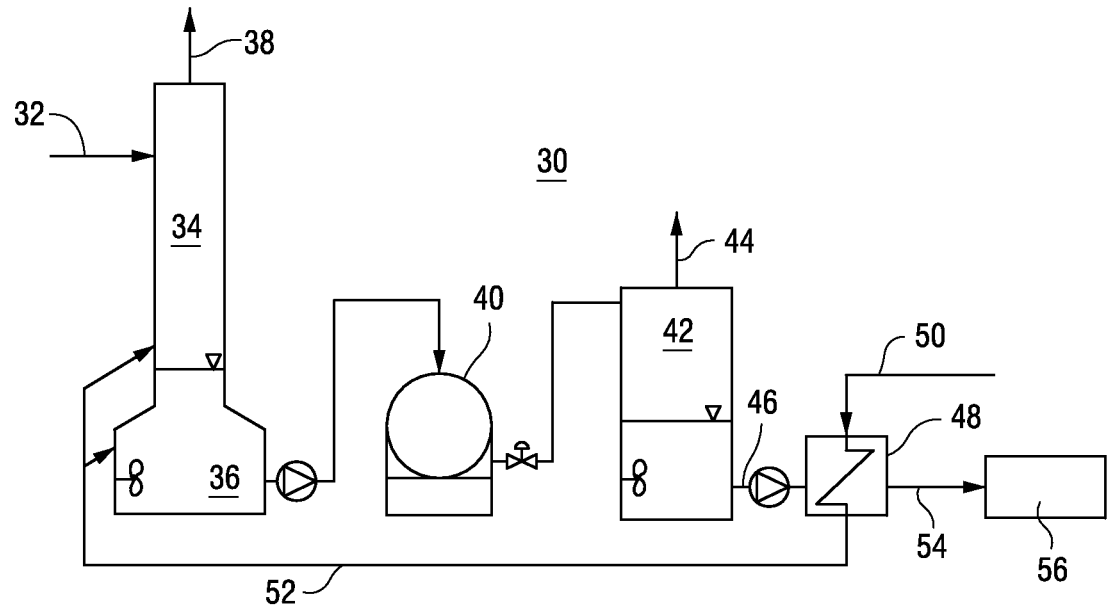
FIG. 2 is a flow sheet for a first embodiment of a pulp refining plant that does recover high pressure steam from flash tanks.

FIG. 2 is a flow sheet for a first embodiment of a pulp refining plant 30 that recovers high pressure steam from flash tanks. The plant 30 improves the optimization of the overall heat balance in the plant by recovering a major portion of the energy applied in the LC or MC stage in the form of steam.

From a blowline 32 of a primary pressurized refiner (see e.g., blowline 24 and refiner 20 in FIG. 1), fibers are discharged into a pressurized cyclone 34, which is sealed at the bottom by a water-lock or liquid phase separator 36. Liquid phase separators are used in several North American TMP plants. In the upper portion of the cyclone 34, steam 38 is separated from the fibers and led to the heat recovery system (not shown). Some of the steam 38 may be utilized to heat dilution water to about 140° C., which is pumped to the water-lock at the bottom of the cyclone.

From the water-lock 36, hot pulp is pumped, at about 4% to 5% consistency, to a low consistency refiner 40. The refiner may be powered by about 150-250 kWh/t. Most of the refining energy is converted into heat that raises the pulp temperature in the refiner 40. The hot pulp is discharged from the refiner to a pressurized flash tank 42 from where virtually fiber-free steam 44 is extracted until the flash tank temperature becomes similar to the temperature in the pressurized cyclone 34.

Pulp entering the flash tank 42 has normally a pressure of between 3 and 6 bars. The pressurized flash tank maintains the pulp at a relatively high pressure, e.g., 3 to 6 bars, to allow for the generation of high pressure and high temperature steam from the tank. The energy in the steam is recovered, such as in a heat exchanger that generates clean steam for a pressurized cyclone. In contrast, prior art flash tanks typically operated at atmospheric pressure and the steam from the tanks was simply exhausted (and not put to any used) or used to heat water up to a relatively low temperature, e.g., a maximum of 90° C.

The pulp discharged 46 from the flash tank passes through a heat-exchanger 48 to transfer heat energy to process water 50 also flowing through the exchanger 48. A valve 49 regulates the pressure of the pulp discharged from the flash tank. The valve may be automatically controlled, with a manually fixed setpoint selected to accommodate the pressure and temperature requirements of the use to which the steam generated by the tank is to be applied.

With this method and apparatus, it is possible to use the steam e.g. in a paper machine for drying, where usually pressures of up to 3 bars are used. The heated process water flows through conduits 52 to the cyclone 34 where the pressurized dilution water enters the pressurized cyclone water-lock 36. From the heat exchanger 48, the cooled pulp 54 flows to a chest 56 for further, e.g., final, latency removal and screening.

In the LC refining plant 30 shown in FIG. 2, a pressurized pulp slurry is expanded in the pressurized flash tank 42 and then passes through a heat exchanger 48 where heat from the slurry is transferred to dilution water 50, that is used in an upstream cyclone 34 of the LC pulp refining process. In an alternative example (shown in FIG. 3), a MC refining plant 58 discharges the pressurized pulp slurry from the refiner 40 to a screw press 60 that dewaters, under pressure, the slurry. Filtrate 64 from the slurry is expanded in a pressurized flash tank 42 and pressate 63, e.g., concentrated pulp, flows from the screw press to further pulp processing stages. The expanded filtrate flows from the tank 42 to a heat exchanger 48 where it heats process water 50 that is fed to the water-lock of the the cylcone 43.

Figure 3:
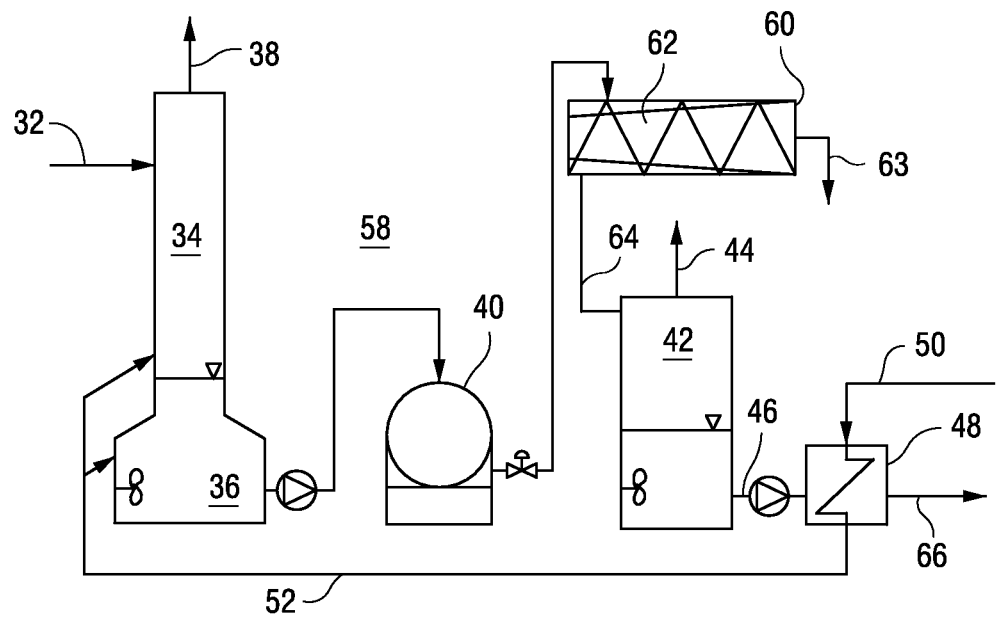
FIG. 3 is a flow sheet for a second embodiment of a pulp refining plant that does recover high pressure steam from flash tanks.

FIG. 3 is a flow sheet for a second embodiment of a pulp refining plant 58 that recovers high pressure steam from flash tanks. To the extent that the plant 58 in FIG. 3 has components in common with the plant 30 shown in FIG. 2, similar reference numerals have been used in both figures.

The flow chart of FIG. 3 shows an alternate process 58 (to that shown in FIG. 2) that also involves pulp washing. The process 58 shown in FIG. 3 may be applied in a MC refining process and the process 30 (FIG. 2) may be applied in a LC refining process. A difference between the two processes, is that pulp flows through a flash tank and heat exchanger in process 30 but not in process 58.

In process 58, a pressurized pulp slurry flows form the pressurized cyclone 34 with the water-lock 36, and is pumped preferably at medium consistency (MC) to a refiner 40. The MC pulp flows from the refiner to a screw-press 60 having a pressurized pressate collection mantle 62. The hot fiber pressate 63 from the screw-press is discharged for further processing. For example, the hot pulp 63 discharged from the screw-press at 30% to 35% consistency may be diluted with the heated white water and pumped to screening after latency treatment.

Filtrate 64 from the screw-press is discharged to a pressurized flash tank 42. The filtrate is substantially water extracted from the pulp slurry in the screw-press. The filtrate may be at a pressure of, for example, 3 to 6 bars. The pressurized filtrate 46 flows from the tank 42 to a heat exchanger 48 in which process water 50 is raised to a temperature suitable for dilution in the pressurized cyclone 34. The partially cooled filtrate 66 is discharged from the heat exchanger may be returned to the refining process, or further cooled with white water and at least partially discharged to effluent treatment because it contains most of the COD generated in the TMP plant. The energy applied by the MC refining process to the pulp slurry (to the extent that the heat is captured in the filtrate) is recovered from the flash tank as steam 44 and heated filtrate 46.

The plant flow sheets shown in FIGS. 2 and 3 provide for a simple mass and energy balance. Both processes 30, 58 provide significant reductions of the energy requirements for thermochemical pulping and allow for the recovery of the energy applied in LC or MC refining as steam suitable for paper drying. The second process 58 is more capital intensive (in that is requires a screw-press), but involves less demanding heat exchanging between the filtrate and process water (as compared to low consistency pulp and process water heat exchanging in process 30). The second process 58 also offers as an additional feature the possibility to effectively wash the pulp.

An description of the method and system is included in the attached "Energy Savings in TMP by High Temperature LC/MC Refining", which is incorporated into this application.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for recovering heat from a pulp refining process comprising:
    discharging pressurized pulp from a high pressure mechanical refiner, wherein the pressurized pulp comprises a pressurized slurry of fibers and liquid;
    introducing at least the liquid from the pressurized pulp to a pressurized flash tank;
    separating pressurized steam from pressurized pulp in the pressurized flash tank, and
    using the separated pressurized steam in the pulp refining process.

2. The method of claim 1 wherein the at least the liquid from the pressurized pulp comprises all of the pressurized pulp slurry which is introduced directly from the high pressure mechanical refiner to the pressurized flash tank.

3. The method of claim 1 further comprises discharging the pressurized pulp from the pressurized flash tank to a heat exchanger; and
    heating dilution water in the heat exchanger with heat from the pressurized pulp.

4. The method of claim 3 further comprising feeding the heated dilution water to a pressurized cyclone upstream of the high pressure mechanical refiner.

5. The method of claim 4 wherein the dilution water is fed to a water-lock of the cyclone.

6. The method of claim 4 wherein the pulp refining process takes place in a pulp mill and the separated pressurized steam from the pressurized cyclone is used as pressurized steam in a separate process in the pulp mill.

7. The method of claim 1 wherein the pressurized pulp is pressurized to between 3 to 6 bars in the high pressure mechanical refiner.

8. The method of claim 1 wherein the pressurized pulp is a low consistency pulp slurry and has a temperature of at least 140° C. in the high pressure mechanical refiner.

9. The method of claim 1 wherein the pressurized pulp has a consistency of 4% to 5% fiber in the pressurized pulp slurry.

10. The method of claim 1 wherein the pressurized pulp is a medium consistency pulp slurry and has a temperature of at least 140° C. in the high pressure mechanical refiner.

11. The method of claim 1 wherein the pressurized pulp has a pulp consistency of at least 10% in the pressurized pulp slurry, and the method further comprises introducing the discharged pressurized pulp to a press and extracting filtrate from the pressurized pulp slurry in the press which discharges the filtrate to the pressurized flash tank and the press discharges a pulp pressate having a consistency of 30% pulp to 35% pulp.

12. The method of claim 1 further comprising passing the discharged pressurized pulp through a screw press and extracting filtrate from the pressurized pulp and separately extracting a pulp pressate from the pressurized pulp, wherein the filtrate is introduced into the flash tank.

13. The method of claim 1 wherein the pulp refining process takes place in a pulp mill and the separated pressurized steam from the pressurized flash tank is used as pressurized steam in a separate process in the pulp mill.

14. A method to recover high pressure steam a mechanical pulp refining process comprising:
   introducing a pressurized pulp slurry to a high pressure mechanical refiner, wherein the pulp slurry comprises fibers and liquid;
   refining the pressurized pulp slurry in the refiner;
   discharging a refined pressurized pulp slurry from the mechanical refiner;
   introducing a least a liquid portion of the discharged refined pressurized pulp slurry to a pressurized flash tank;
   separating pressurized steam from at least a liquid portion of the discharged refined pressurized pulp slurry in the pressurized flash tank;
   applying the separated pressurized steam from the flash tank for use in another process in a pulp mill.

15. The method in claim 14 wherein the pressurized pulp slurry introduced to the high pressure mechanical refiner has a consistency of no more than 5% fibers.

16. The method in claim 14 further comprising:
   introducing the pressurized pulp slurry to a pressurized cyclone, extracting steam from the pressurized pulp slurry;
   using the pressurized pulp slurry discharged from the cyclone as the pressurized pulp slurry introduced to the high pressure mechanical refiner;
   heating water in a heat exchanger with heat energy from the pressurized refined pulp discharged from the flash tank, and
   introducing the heated water from the heat exchanger to the pressurized cyclone.

17. The method in claim 14 further comprising separating the liquid in the refined pressurized pulp slurry in a press, separating the liquid from the pulp slurry in the press and introducing to the pressurized flash tank the separated liquid.

18. The method in claim 14 wherein an entirety of the refined pressurized pulp slurry is introduced into the pressurized flash tank.

* * * * *